(12) United States Patent
Chen et al.

(10) Patent No.: US 8,823,340 B2
(45) Date of Patent: Sep. 2, 2014

(54) CONTROL CIRCUIT AND METHOD FOR A BUCK-BOOST SWITCHING CONVERTER

(75) Inventors: Wen-Wei Chen, New Taipei (TW); Kuo-Chi Liu, Hsinchu (TW)

(73) Assignee: Richtek Technology Corporation, Chupei (TW)

(*) Notice: Subject to any disclaimer, the term of this patent is extended or adjusted under 35 U.S.C. 154(b) by 484 days.

(21) Appl. No.: 13/080,963

(22) Filed: Apr. 6, 2011

(65) Prior Publication Data

US 2012/0146602 A1  Jun. 14, 2012

(30) Foreign Application Priority Data

Dec. 9, 2010 (TW) .................................. 99143110 A (51) Int. Cl.
*G05F 3/16* (2006.01)
*H02M 3/158* (2006.01)

(52) U.S. Cl.
CPC .................................. *H02M 3/1582* (2013.01)
USPC .............................. 323/259; 323/271; 323/284

(58) Field of Classification Search
USPC ......... 323/222, 242, 243, 271, 282, 283, 284, 323/285, 334, 259, 344
See application file for complete search history.

(56) References Cited

U.S. PATENT DOCUMENTS

| | | | |
|---|---|---|---|
| 7,777,457 B2* | 8/2010 | Haiplik | 323/222 |
| 8,698,467 B2* | 4/2014 | Oki | 323/282 |
| 2010/0231189 A1* | 9/2010 | Chen et al. | 323/284 |
| 2011/0074373 A1* | 3/2011 | Lin | 323/282 |

* cited by examiner

*Primary Examiner* — Gary L Laxton
*Assistant Examiner* — Afework Demisse (57) ABSTRACT

A control circuit and method for a buck-boost switching converter provides a mode determinative circuit to judge the timing of an operation under buck-boost mode based on the input voltage, the output voltage and the mode reference voltage; meanwhile, the control signal generating circuit is provided to turn off the second switch during the first switch being on, turn on the second switch during the first switch being off, turn off the fourth switch during the third switch being on, turn on the fourth switch during the third switch being off, wherein the duty cycles of the first and third switches are identical, and duty cycles of the second and fourth switches are identical.

26 Claims, 9 Drawing Sheets

CONTROL CIRCUIT AND METHOD FOR A BUCK-BOOST SWITCHING CONVERTER

BACKGROUND OF THE INVENTION

1. Field of the Invention

The present invention is related to a buck-boost switching converter, and particularly to a highly efficient control circuit and method for a buck-boost switching converter.

2. Brief Description of the Related Art

In order to maintain an electronic device installed with batteries to provide a steady input power source, usually the buck-boost converter is utilized to regulate the power source. However, the conventional buck-boost converter is less effective and it is essential to promote the efficiency thereof to meet the tendency for requiring a modernized electronic device.

U.S. Pat. No. 6,166,527 entitled "CONTROL CIRCUIT AND METHOD FOR MAINTAINING HIGH EFFICIENCY IN A BUCK-BOOST SWITCHING REGULATOR" proposes that the switching regulator can be operated in a buck mode in case of the input voltage being higher, in a buck-boost mode in case of the input voltage approaching the standard output voltage, and in a boost mode in case of the input voltage being lower for keeping the converter with high efficiency in operation. However, the buck-boost switching regulator of the prior reference still has deficiencies which are worth to improve substantially.

SUMMARY OF THE INVENTION

Accordingly, an object of the present invention is to provide a control circuit and method with which a switching converter is capable of not only maintaining a high efficiency operation but also being set and regulated in the buck-boost mode easily for the operational modes being switched as less as possible and enhancing integral efficiency of the circuit.

In order to achieve the preceding object, the control circuit for a buck-boost switching converter according to the present invention is adapted to control a buck-boost switching converter which has an input end, an output end, a ground end, an inductor, a first switch connected to the input end and the first end of the inductor, a second switch connected to the first end of the inductor and the ground end, a third switch connected to the second end of the inductor and the ground end, and a fourth switch connected to the second end of the inductor and the output end, wherein an input voltage of the buck-boost switching converter is regulated as a steady output voltage; the control circuit comprises a feedback compensative circuit, a mode determinative circuit, a waveform generating circuit, a comparing signal generating circuit, and a control signal generating circuit.

The feedback compensative circuit is coupled to the output end and an output reference voltage for generating a compensative voltage based on the output voltage and the output reference voltage; the mode determinative circuit judges and generates a buck-boost operation mode signal based on the input voltage, the output voltage, and a mode reference voltage, to determine the timing of the operation in the buck-boost mode.

The waveform generating circuit generates at least a periodic waveform signal; the comparing signal generating circuit is coupled to the waveform generating circuit, the feedback compensative circuit and the mode determinative circuit to generate a first reference compensative voltage and a second reference compensative voltage based on the compensative voltage, and generate a first reference waveform signal and a second reference waveform signal based on the at least one waveform signal.

The control signal generating circuit is coupled to the comparing signal generating circuit for generating a first, second, third, and fourth control signals to control the first, second, third, and fourth switches respectively based on the first and second reference compensative voltages and the first and second reference waveform signals so as to turn off the second switch during the first switch being on, turn on the second switch during the first switch being off, turn off the fourth switch during the third switch being on, and turn on the fourth switch during the third switch being off, and duty cycles of the first and third switches being identical and duty cycles of the second and fourth switches being identical during the operation in the buck-boost mode.

In a preferred embodiment, the comparing signal generating circuit of the control circuit outputs the first and second reference compensative voltages which are identical, and the first and second reference waveform signals which are identical when the operation is in the buck-boost mode such that the control signal generating circuit is capable of controlling the duty cycles of first and third switches to be identical and the duty cycles of second and fourth switches to be identical.

In the preferred embodiment, the comparing signal generating circuit is a level shifting circuit to output the compensative voltage as the first reference compensative voltage directly and shift the compensative voltage a direct current level which is not less than a peak-to-peak value of the first and second reference waveform signals so as to generate the second reference compensative voltage when the operation is in the buck mode or the boost mode; wherein the level shifting circuit comprises a resistor coupled to the feedback compensative circuit, a current source connecting with the resistor in series, and a switch connecting with the resistor in parallel and controlled by the buck-boost operation mode signal to operate turn-on and turn-off when the operation is under the buck-boost mode. The level shifting circuit can merely comprise a resistor coupled to the feedback compensative circuit, and a current source connecting with the resistor in series and being controlled by the buck-boost operation mode signal to determine magnitude of a current passing through the resistor.

In the preferred embodiment, the comparing signal generating circuit is a level shifting circuit to output the waveform signal as the first reference waveform signal directly and shift the waveform signal a direct current level which is not less than a peak-to-peak value of the waveform signal so as to generate the second reference waveform signal when the operation is in the buck mode or the boost mode; wherein the level shifting circuit comprises a resistor coupled to the waveform generating circuit, a current source connecting with the resistor in series, and a switch connecting with the resistor in parallel and controlled by the buck-boost operation mode signal to operate turn-on and turn-off. The level shifting circuit further can only comprise a resistor coupled to the waveform generating circuit, and a current source connecting with the resistor in series and controlled by the buck-boost operation mode signal to determine magnitude of a current passing through the resistor.

In the preferred embodiment, the mode determinative circuit comprises a first differential generator, a second differential generator, a first comparator, a second comparator, and an AND gate; wherein the first differential generator generates an input-output difference between the input voltage and the output voltage, the second differential generator generates an output-input difference between the input voltage and the output voltage, the first comparator having a first input end connected to the first differential generator, a second input end connected to the mode reference voltage, and an output end, the second comparator having a first input end connected to the second differential generator, a second input end connected to the mode reference voltage, and an output end, and the AND gate having two input ends connecting with the output end of the first comparator and the output end of the second comparator respectively to generate the preceding buck-boost operation mode signal.

The present invention further provides a control method adapted to control a buck-boost switching converter which has an input end, an output end, a ground end, an inductor with first end and a second end, a first switch connected to the input end and the first end of the inductor, a second switch connected to the first end of the inductor and the ground end, a third switch connected to the second end of the inductor and the ground end, and a fourth switch connected to the second end of the inductor and the output end, wherein an input voltage of the buck-boost switching converter is regulated as a steady output voltage.

The control method comprises following steps: generating a compensative voltage based on the output voltage and the output reference voltage, judging and generating a buck-boost operation mode signal based on the input voltage, the output voltage, and a mode reference voltage to determine the timing of an operation in the buck-boost mode, generating at least one periodic waveform signal, generating a first reference compensative voltage and a second reference compensative voltage based on the compensative voltage, and generating a first reference waveform signal and a second reference waveform signal based on said at least one waveform signal, generating a first, second, third, and fourth control signals to control the first, second, third, and fourth switches respectively based on the first and second reference compensative voltages and the first and second reference waveform signals so as to turn off the second switch during the first switch being on, turn on the second switch during the first switch being off, turn off the fourth switch during the third switch being on, and turn on the fourth switch during the third switch being off, and duty cycles of said first and third switches being identical and duty cycles of said second and fourth switches being identical during the operation in the buck-boost mode.

Wherein, when the operation is in the buck-boost mode, the first and second reference compensative voltages which are set to be identical, and the first and second reference waveform signals which are set to be identical so as to control the duty cycles of the first and third switches to be identical and the duty cycles of the second and fourth switches to be identical.

Wherein, when the operation is in the buck mode or the boost mode, the compensative voltage is output as the first reference compensative voltage directly and shifted a direct current level which is not less than a peak-to-peak value of the first and second reference waveform signals so as to generate the second reference compensative voltage; when the operation is in the buck mode or the boost mode, the compensative voltage is output as the first reference compensative voltage and the second reference compensative voltage.

Wherein, when the operation is in the buck mode or the boost mode, the waveform signal is output as the first reference waveform signal directly and shifted a direct current level which is not less than a peak-to-peak value of the waveform signal so as to generate the second reference waveform signal.

Wherein, steps for determining the buck-boost mode comprises: generating an input-output difference between the input voltage and the output voltage, generating an output-input difference between the input voltage and the output voltage, generating the buck-boost operation mode signal for the buck-boost switching converter operating in the buck-boost mode when the input-output difference and the output-input difference are less than the mode reference voltage.

From the foregoing, the control circuit and method for a buck-boost switching converter according to the present invention at least has the following advantages:

1. The control circuit and method of the present invention are capable of implementing a buck-boost switching converter with high efficiency.

2. The control circuit and method of the present invention are compatible with both the voltage or current controlled buck-boost switching converter.

3. The control circuit and method of the present invention are available for the buck-boost operation modes of the switching converter to be set and regulated easily and switched as less as possible for enhancing integral efficiency of the circuit.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
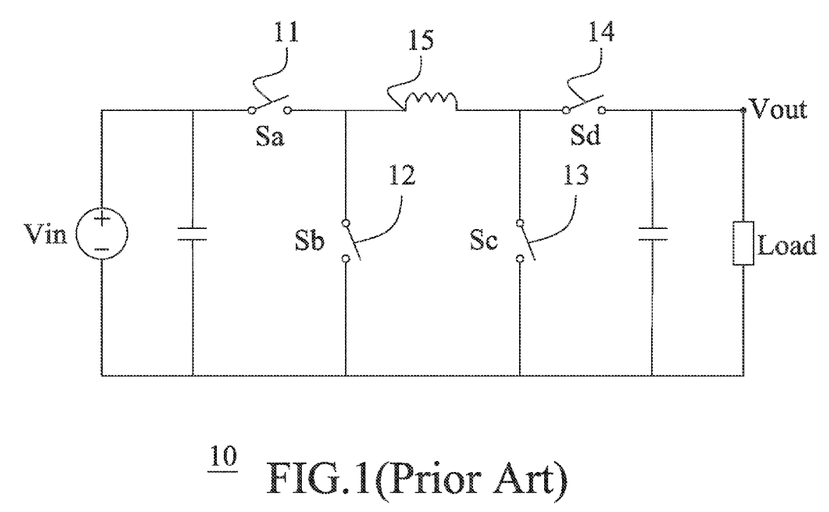
FIG. 1 is a circuit diagram of the conventional buck-boost switching converter.

Referring to FIG. 1, a circuit diagram of the conventional buck-boost switching converter is illustrated. The conventional buck-boost switching converter 10, which is used to regulate an input voltage Vin as a steady output voltage Vout, provides switches 11, 12, 13, 14 and an inductor 15. The switch 11 is connected to an input end and the first end of the inductor 15; the switch 12 is connected to the first end of the inductor 15 and a ground end; the switch 13 is connected to the second end of the inductor 15 and the ground end; the switch 14 is connected to the second end of the inductor 15 and the output end. Further, the switches 11, 12, 13, 14 are controlled to be turned on or turned off with control signals Sa, Sb, Sc, Sd output by control circuits 20, 70, 80 shown in FIGS. 3, 8, and 12 respectively.

Figure 2:
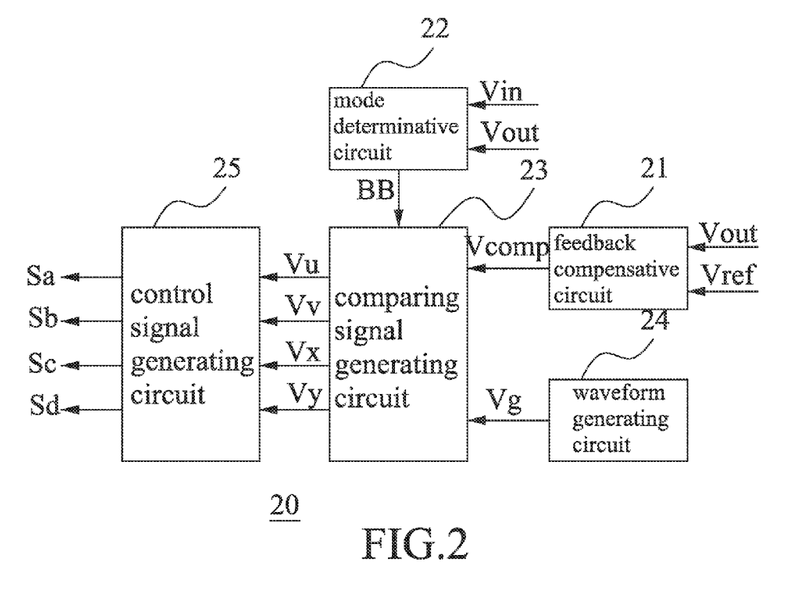
FIG. 2 is a block diagram of the preferred embodiment of a control circuit for a buck-boost switching converter according to the present invention.
Figure 3:
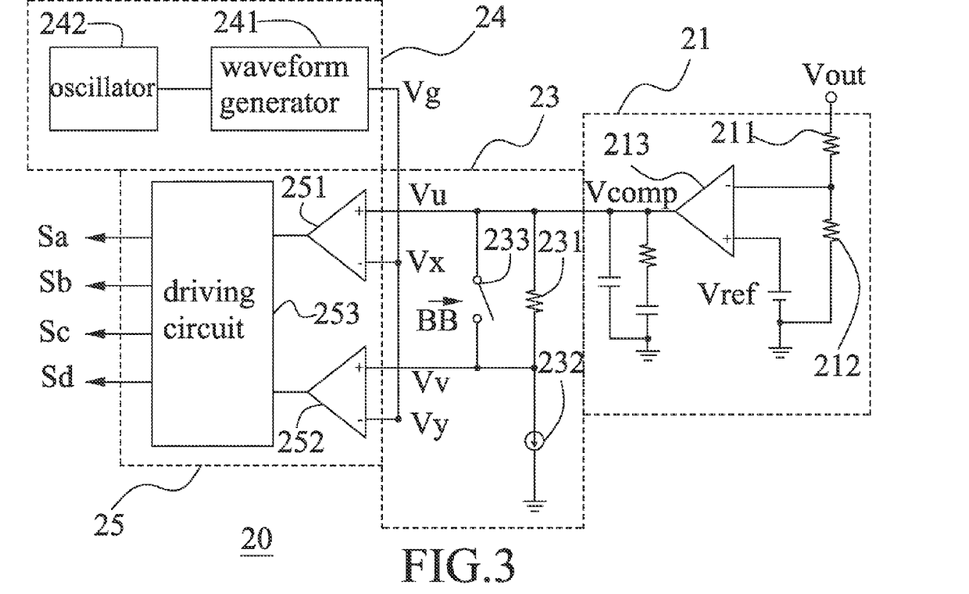
FIG. 3 is a circuit diagram of the first preferred embodiment of a control circuit for a buck-boost switching converter according to the present invention.
Figure 4:
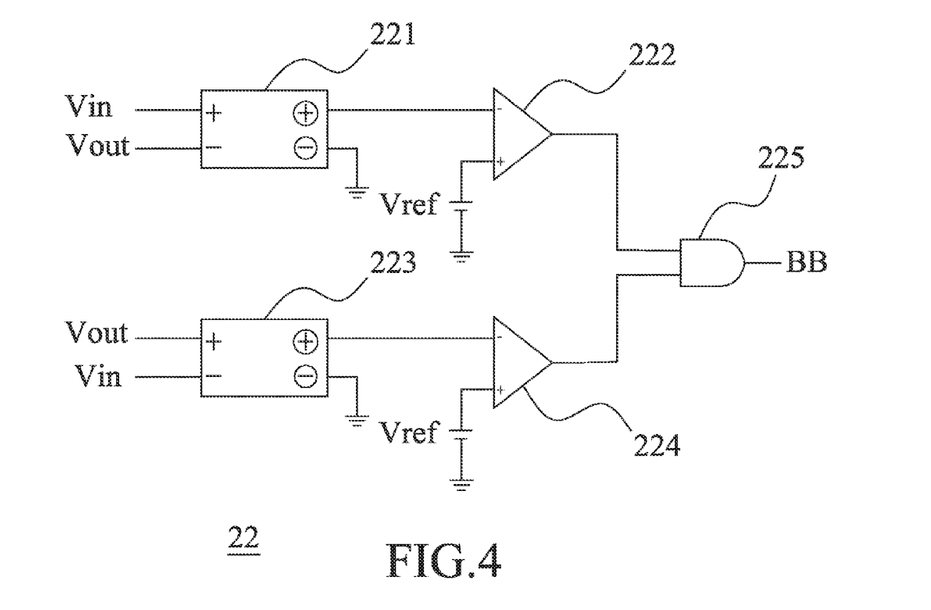
FIG. 4 is a circuit diagram of a mode determinative circuit in the control circuit for the buck-boost switching converter shown in FIG. 3.

Referring to FIGS. 2, 3, and 4, the first embodiment of the control circuit for the buck-boost switching converter according to the present invention is illustrated. The control circuit 20 comprises a feedback compensative circuit 21, a waveform generating circuit 24, a comparing signal generating circuit 23, and a control signal generating circuit 25. Besides, the comparing signal generating circuit 23 is controlled with a buck-boost operation mode signal BB generated by a mode determinative circuit 22, and the principle of the operation thereof will be recited in details afterward with reference to FIGS. 5, 6 and 7.

The feedback compensative circuit 21 in FIG. 3 includes an amplifier 213, and resisters 211, 212. The amplifier 213 has an output end, a negative input end, and a positive input end connected to an output reference voltage Vref; the resister 211 is connected to the output end of the buck-boost switching converter 10 shown in FIG. 1 and the negative input end of the amplifier 213 respectively; the resistor 212 is connected to the negative input end of the amplifier 213 and the ground end. Thus, the feedback compensative circuit 21 is capable of producing a compensative voltage Vcomp based on a difference between the output voltage Vout of the buck-boost switching converter 10 and the output reference voltage Vref.

The waveform generating circuit 24 includes an oscillator 242 and a waveform generator 241; the oscillator 242 is utilized to generate a clock signal for the waveform generator 241 being capable of generating a periodic waveform signal Vg to input to negative input ends of comparators 251, 252 in the control signal generating circuit 25 as reference waveform signals Vx and Vy.

The comparing signal generating circuit 23 such as a level shifting circuit is utilized to output the compensative voltage Vcomp generated by the feedback compensative circuit 21 directly as a reference compensative voltage Vu and to shift the compensative voltage Vcomp a direct current level which is not less than a peak to peak value of the reference waveform signals Vx and Vy for generating a reference compensative voltage Vv. The level shifting circuit in the present embodiment includes a resistor 231 coupled to the output end of the amplifier 213 in the feedback compensative circuit 21, a current source 232 connected to the resistor 231 in series, and a switch 233 connected to the resistor 231 in parallel.

The control signal generating circuit 25 includes comparators 251, 252 and a driving circuit 253; the comparator 251 has a positive input end connected to the reference compensative voltage Vu, a negative input end connected to the reference waveform signal Vx, and an output end; the comparator 252 has a positive input end connected to the reference compensative voltage Vv, a negative input end connected to the reference waveform signal Vy, and an output end; the driving circuit 253 is coupled to the output ends of the comparators 251, 252 to generate the control signals Sa, Sb, Sc, Sd to control the switches 11, 12, 13, 14 shown in FIG. 1 based on a comparative result obtained from the reference compensative voltage Vu being compared to the reference waveform signal Vx with the comparator 251 and a comparative result obtained from the reference compensative voltage Vv being compared to the reference waveform signal Vy with the comparator 252.

Figure 5:
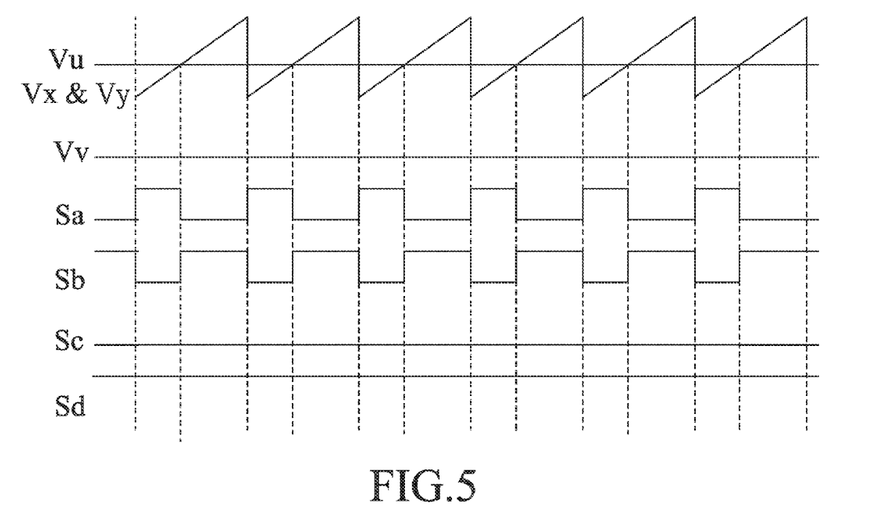
FIG. 5 is a waveform diagram of the buck-boost switching converter shown in FIG. 3 during an operation being in the buck mode.

Wherein, when an operation is performed in the buck mode, the waveform is as it is shown in FIG. 5. At this moment, the reference compensative voltage Vu overlaps the reference waveform signal Vx, and the reference compensative voltage Vv is always less than the reference waveform signal Vy such that the control signal Sc controls the switch 13 to maintain in a state of being off, the control signal Sd controls the switch 14 to maintain in a state of being on, the control signal Sa controls a duty cycle of the switch 11 being on in accordance with relationship between the reference compensative voltage Vu and the reference waveform signal Vx, and the control signal Sb controls to turn off the switch 12 during the switch 11 being on and to turn on the switch 12 during the switch 11 being off.

Figure 6:
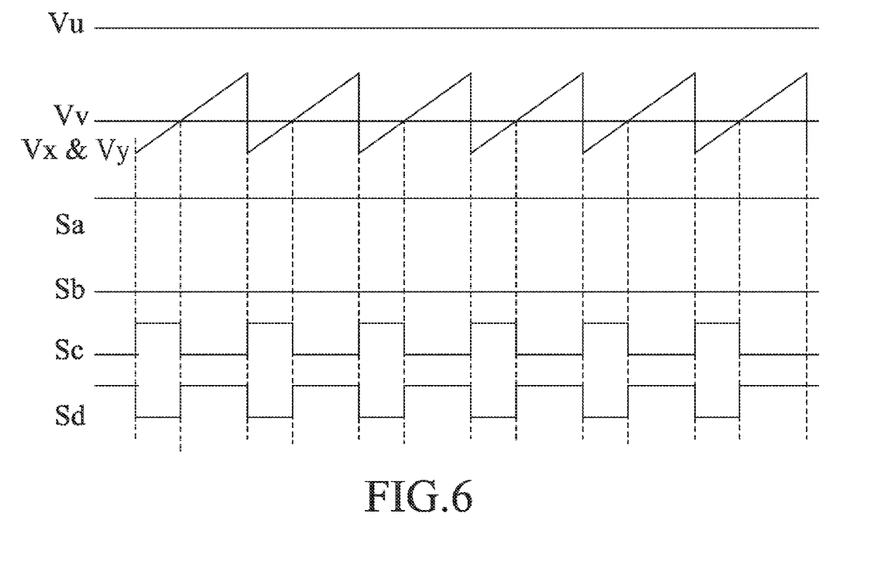
FIG. 6 is a waveform diagram of the buck-boost switching converter shown in FIG. 3 during the operation being in the boost mode.

Besides, when the operation is performed in the boost mode, the waveform is shown in FIG. 6. At this moment, the reference compensative voltage Vv overlaps the reference waveform signal Vy, and the reference compensative voltage Vu is always greater than the reference waveform signal Vx such that the control signal Sa controls the switch 11 to maintain in a state of being on, the control signal Sb controls the switch 12 to maintain in a state of being off, the control signal Sc controls the duty cycle of the switch 13 being on in accordance with relationship between the reference compensative voltage Vv and the reference waveform signal Vy, and the control signal Sd controls to turn off the switch 14 during the switch 13 being on and to turn on the switch 14 during the switch 13 being off.

FIG. 4 shows one of exemplary illustrations of the mode determinative circuit 22 to generate a buck-boost operation mode signal BB for controlling to turn on or off the switch 233 in FIG. 3. The mode determinative circuit 22 in FIG. 4 includes differential generators 221, 223, comparators 222, 224, and an AND gate 225; the differential generator 221 is utilized to generate an input-output difference between the input voltage Vin and the output voltage Vout; the differential generator 223 is utilized to generate an output-input difference between the input voltage Vin and the output voltage Vout.

The comparator 222 has a negative input end connected to the differential generator 221, a positive end connected to the mode reference voltage Vref, and an output end; when a difference obtained with the output voltage Vout being subtracted from the input voltage Vin (i.e. the input-output difference) is less than the mode reference voltage Vref, the output end is set as a high level. The comparator 224 has a negative input end connected to the differential generator 223, a positive end connected to the mode reference voltage Vref, and an output end; when a difference obtained with the input voltage Vin being subtracted from the output voltage Vout (i.e. the output-input difference) is less than the mode reference voltage Vref, the output end is set as a high level. The AND gate 225 has two input ends connected to the output ends of the comparators 222, 224 respectively; when the output ends of the comparators 222, 224 are set as the high level respectively, the buck-boost operation mode signal BB is set as the high level to turn on the switch 233 shown in FIG. 3.

Figure 7:
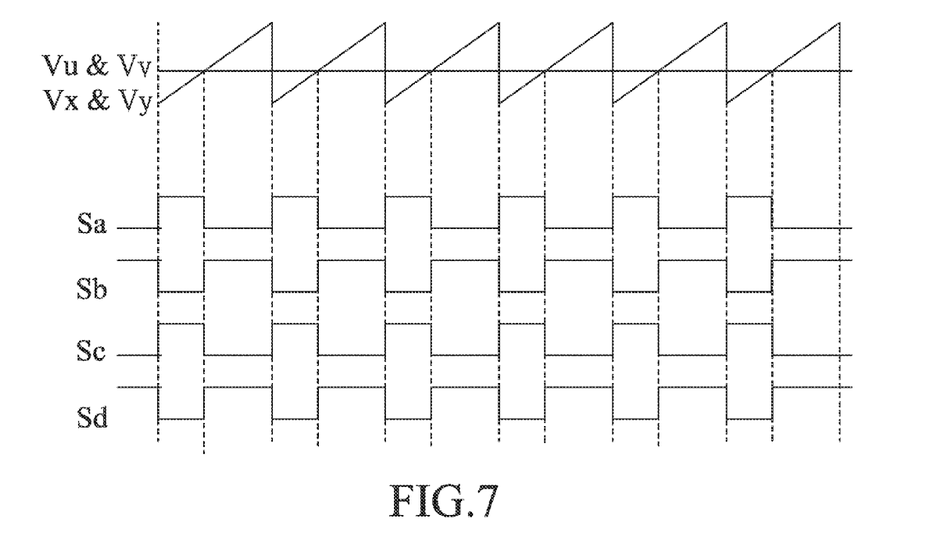
FIG. 7 is a waveform diagram of the buck-boost switching converter shown in FIG. 3 during the operation being in the buck-boost mode.

At this moment, the mode determinative circuit 22 has already set the reference compensative voltage Vu to be identical with the reference compensative voltage Vv such that the buck-boost switching converter 10 is capable of being operated in the buck-boost mode; the waveform of the operation is shown in FIG. 7. Thus, if the mode reference voltage Vref connected to the comparators 222, 224 has the voltage thereof being regulated downward, an operation range of the buck-boost switching converter 10 operated in the buck-boost mode can be reduced under control of the control circuit 20 for enhancing the integral operation efficiency of the circuit.

Because the reference compensative voltages Vu, Vv overlap the reference waveform signals Vx, Vy shown in FIG. 7, the control signal Sa controls the duty cycle of the switch 11 which is on based on a relationship between the reference compensative voltage Vu and the reference waveform signal Vx; the control signal Sc controls the duty cycle of the switch 13 which is on based on a relationship between the reference compensative voltage Vv and the reference waveform signal Vy; the control signal Sb turns off the switch 12 during the switch 11 being on and to turn on the switch 12 during the switch 11 being off; the control signal Sd turns off the switch 14 during the switch 13 being on and to turn on the switch 14 during the switch 13 being off. Wherein, the duty cycle of the switch 11 is identical with the duty cycle of the switch 13, and the duty cycle of the switch 12 is identical with the duty cycle of the switch 14.

Figure 8:
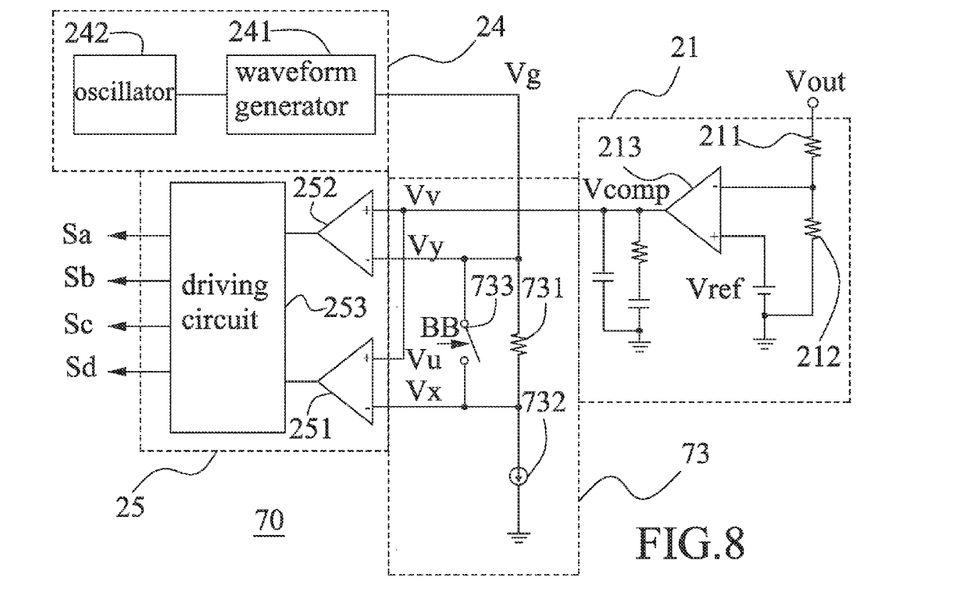
FIG. 8 is a circuit diagram of the second preferred embodiment of a control circuit for a buck-boost switching converter according to the present invention.

Referring to FIG. 8, the second embodiment of the control circuit of the buck-boost switching converter according to the present invention is illustrated. The control circuit for the buck-boost switching converter 70 in the present embodiment comprises a feedback compensative circuit 21, a waveform generating circuit 24, a comparing signal generating circuit 73, and a control signal generating circuit 25. Besides, a switch 733 of the comparing signal generating circuit 73 is controlled to be turned on or off with a buck-boost operation mode signal BB generated by the mode determinative circuit 22 shown in FIG. FIG. 4, and the principle of the operation thereof will be recited in details afterward with reference to FIGS. 9, 10 and 11.

Figure 9:
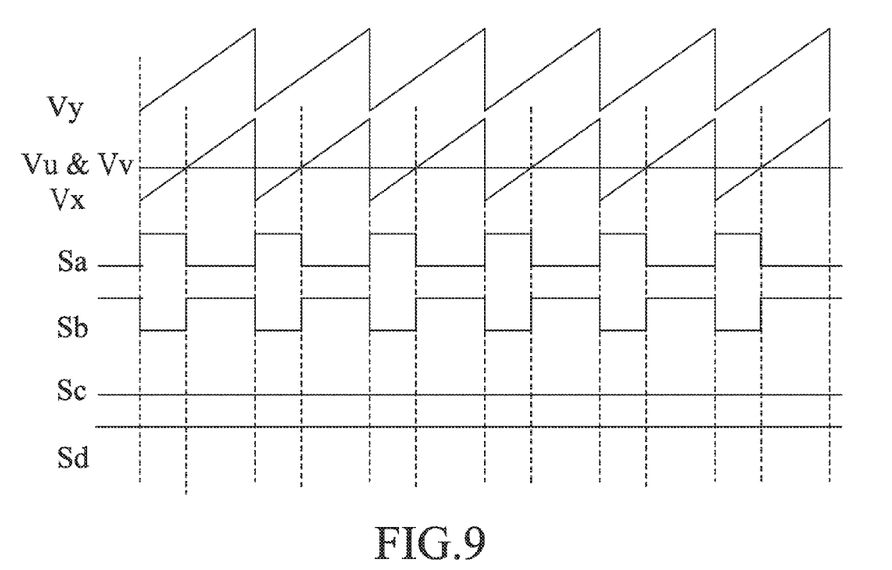
FIG. 9 is a waveform diagram of the buck-boost switching converter shown in FIG. 8 during the operation being in the buck mode.
Figure 10:
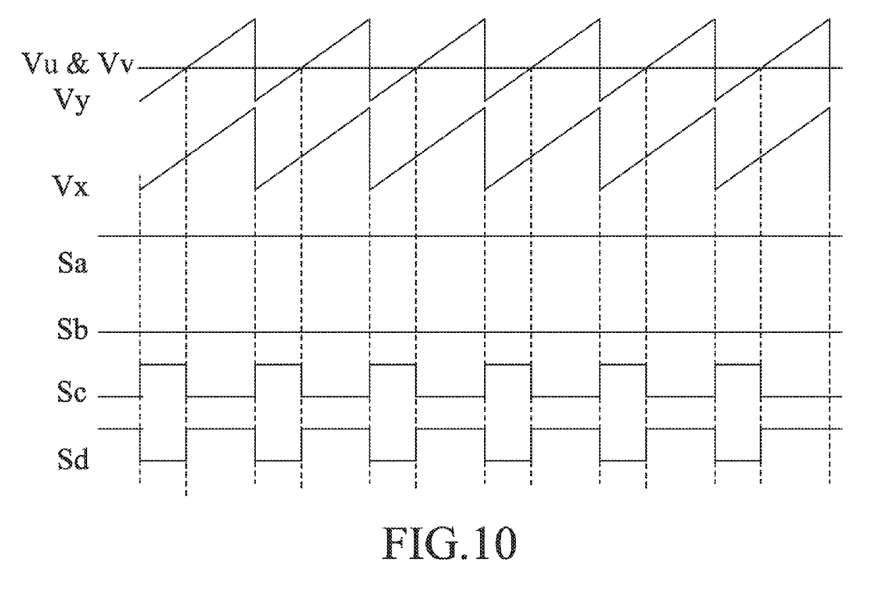
FIG. 10 is a waveform diagram of the buck-boost switching converter shown in FIG. 8 during the operation being in the boost mode.

The feedback compensative circuit 21, the waveform generating circuit 24, and the control signal generating circuit 25 shown in FIG. 8 and FIG. 3 are identical, and no details for the preceding circuits 21, 24 and 25 will be described further. In the present embodiment, the comparing signal generating circuit 73, which is a level shifting circuit as well, includes a resistor 731 coupled to the waveform generator 241, a current source 732 connected to the resistor 731 in series, and a switch 733 connected to the resistor 731 in parallel; when it is utilized to perform an operation in the boost mode or the buck mode, a waveform signal Vg generated by the waveform generator 241 is output directly as a reference waveform signal Vy, shifts a direct current level not less than a peak to peak value thereof, and generate a reference waveform signal Vx; the reference compensative voltage Vu and Vv are connected to the output end of an amplifier 213.

when an operation is performed in the buck mode, the waveform is shown in FIG. 9. At this moment, the reference compensative voltage Vu overlaps the reference waveform signal Vx, the reference compensative voltage Vv is always less than the reference waveform signal Vy such that the control signal Sc controls the switch 13 to maintain in a state of being off, the control signal Sd controls the switch 14 to maintain in a state of being on, the control signal Sa controls the duty cycle of the switch 11 being on based on a relationship between the reference compensative voltage Vu and the reference waveform signal Vx, and the control signal Sb controls the switch 12 to be turned off during the switch 11 being on and to be turned on during the switch 11 being off.

when an operation is performed in the boost mode, the waveform is shown in FIG. 10. At this moment, the reference compensative voltage Vv overlaps the reference waveform signal Vy, and the reference compensative voltage Vu is always greater than the reference waveform signal Vx such that the control signal Sa controls the switch 11 to maintain in a state of being on, the control signal Sb controls the switch 12 to maintain in a state of being off, the control signal Sc controls the duty cycle of the switch 13 being on in accordance with relationship between the reference compensative voltage Vv and the reference waveform signal Vy, and the control signal Sd controls to turn off the switch 14 during the switch 13 being on and to turn on the switch 14 during the switch 13 being off.

Figure 11:
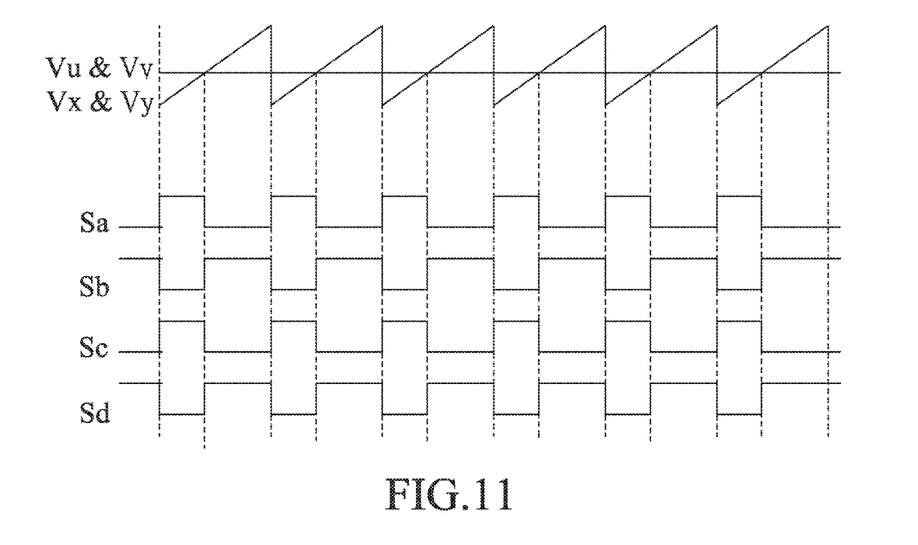
FIG. 11 is a waveform diagram of the buck-boost switching converter shown in FIG. 8 during the operation in the buck-boost mode.

Besides, when the mode determinative circuit 22 turns on the switch 733 to set the reference waveform signal Vx to be identical with the reference waveform signal Vy such that the buck-boost switching converter 10 is capable of operating in the buck-boost mode, the waveform of the operation is shown in FIG. 11. Because the reference compensative voltages Vu, Vv overlap the reference waveform signals Vx, Vy, the control signal Sa controls the duty cycle of the switch 11 being on based on a relationship between the reference compensative voltage Vu and the reference waveform signal Vx; the control signal Sc controls the duty cycle of the switch 13 being on based on a relationship between the reference compensative voltage Vv and the reference waveform signal Vy; the control signal Sb turns off the switch 12 during the switch 11 being on and turns on the switch 12 during the switch 11 being off; the control signal Sd turns off the switch 14 during the switch 13 being on and turns on the switch 14 during the switch 13 being off. Wherein, the duty cycle of the switch 11 is identical with the duty cycle of the switch 13, and the duty cycle of the switch 12 is identical with the duty cycle of the switch 14.

Figure 12:
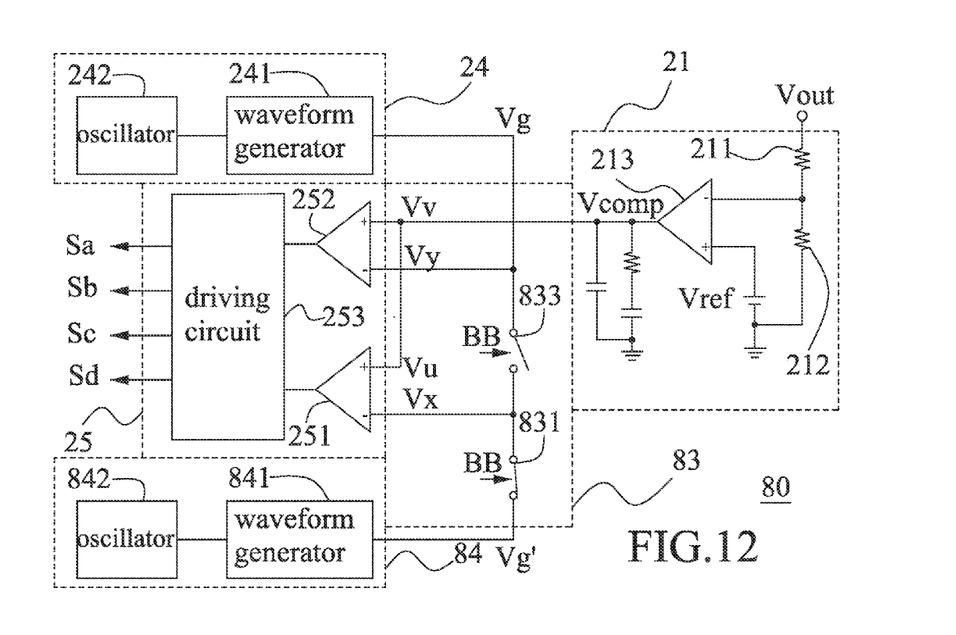
FIG. 12 is a circuit diagram of the third preferred embodiment of a control circuit for a buck-boost switching converter according to the present invention.

Referring to FIG. 12, the third embodiment of the control circuit of the buck-boost switching converter according to the present invention is illustrated. The control circuit for the buck-boost switching converter 80 in the present embodiment comprises a feedback compensative circuit 21, waveform generating circuits 24, 84, a comparing signal generating circuit 83, and a control signal generating circuit 25. Besides, switches 831, 833 of the comparing signal generating circuit 83 is controlled to be turned on or off with a buck-boost operation mode signal BB generated by the mode determinative circuit 22 shown in FIG. 4.

The feedback compensative circuit 21, the waveform generating circuit 24, and the control signal generating circuit 25 shown in FIG. 12 and FIG. 3 are identical, and no details for the preceding circuits 21, 24 and 25 will be described further. An oscillator 842 and a waveform generator 841 included in a waveform generating circuit 84 are similar to the oscillator 242 and the waveform generator 241 in the wave generating circuit 24. In a comparing signal generating circuit 83, the reference compensative voltages Vu and Vv are directly connected to the output end of an amplifier 213, the reference waveform signal Vy is connected to the waveform generator 241 directly, the reference waveform signal Vx is connected to the waveform generator 841 via the switch 831, and the switch 833 is disposed between and connected to the reference waveform signals Vx, Vy. Wherein, the reference waveform signals Vx, Vy are respectively generated by the waveform generators 241, 841 with a difference of a direct current level between the reference waveform signals Vx, Vy without overlapping with each other as shown in FIGS. 9 and 10.

when the operation is in the buck mode, the waveform is similar to FIG. 9; when the operation is in the boost mode, the waveform is similar to FIG. 10. In addition, when the mode determinative circuit 22 turns on the switch 833 and turns off the switch 831, and the reference waveform signals Vx and Vy are connected to the waveform generator 241 for the buck-boost switching converter 10 operating in the buck-boost mode, the operational waveform diagram is similar to FIG. 11 and has been recited previously.

Although the periodic waveform signals produced by waveform generators 241, 841 are exemplified to illustrate as saw-tooth waves in the figures of the preceding embodiment, persons who are skillful in the art know that other waveform generators for generating a periodic triangular waveform or the like can be utilized as well.

The reference waveform signal Vx or Vy in the preceding embodiment is obtained via the periodic waveform signals generated with the waveform generators 241, 841 being directly connected to or shifted a direct current level; this way is normally called a voltage control type control circuit of a buck-boost switching converter. If a current control type control circuit of a buck-boost switching converter is used, the waveform generating circuits 24, 84 should be replaced with the waveform generating circuit 90 shown in FIG. 13, respectively.

Figure 13:
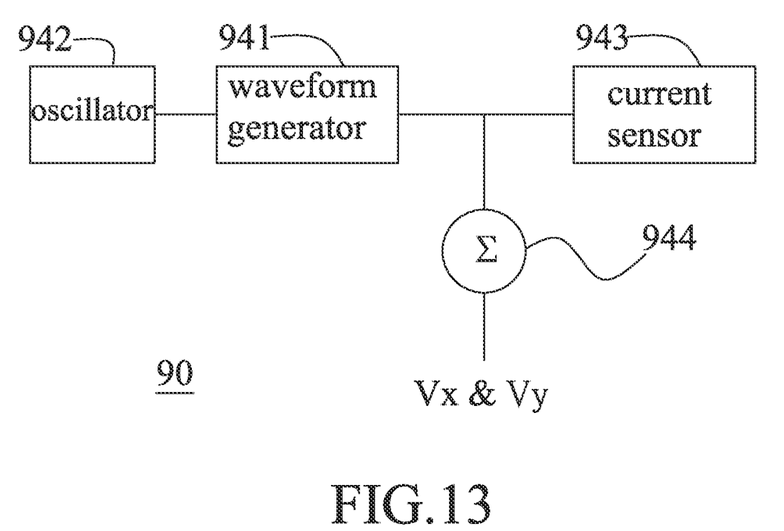
FIG. 13 is a block diagram of a waveform generating circuit of a current controlled buck-boost switching converter.

In FIG. 13, the waveform generating circuit 90 further includes a current sensor 943 and a summation circuit 944 in addition to an oscillator 942 and a waveform generator 941 similar to the oscillator 242 and the waveform generator 241 in the waveform generating circuit 24 respectively. Wherein, the current sensor 943 is utilized to sense the current passing through the inductor 15 or any one of the switches 11, 12, 13 in FIG. 1 to generate a sensing waveform signal; the summation circuit 944 is connected to the current sensor 943 and the waveform generator 941 to sum up the periodic wave signal generated by the waveform generator 941 and the sensing waveform signal generated by the current sensor 943.

Figure 14:
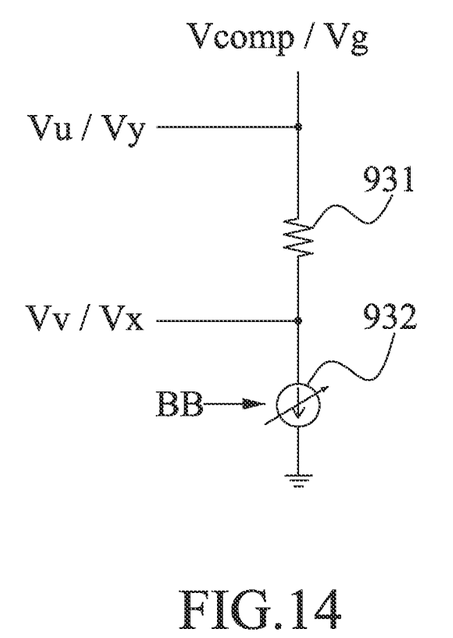
FIG. 14 is a circuit diagram of a preferred embodiment of another level shifting circuit of the buck-boost switching converter according to the present invention.

Although the level shifting circuit in FIG. 3 is exemplary to include the resistor 231 coupled to the output end of the amplifier 213 of the feedback compensative circuit 21, the current source 232 connected to the resistor 231 in series, and the switch 233 connected to the resistor 231 in parallel, and the level shifting circuit in FIG. 8 includes the resistor 731 coupled to the waveform generator 241, the current source 732 connected to the resistor 731 in series, and the switch 733 connected to the resistor 731 in parallel, the level shifting circuit in FIG. 14 can merely include a resistor 931 connected to the feedback compensative circuit 21 or the waveform generator 241 and current source 932 connected to the resistor 931 in series instead. At this moment, the current in the current source 932 is controlled by the buck-boost operation mode signal BB generated by the mode determinative circuit 22 in FIG. 4 to determine the magnitude of the current passing through the resistor. That is, when the mode determinative circuit 22 generates the buck-boost operation mode signal BB to determine the operation being in buck-boost mode, the output current of the current source 932 is controlled to be zero current for the resistor 931 connected to the current source 932 in series being without a voltage drop.

Figure 15:
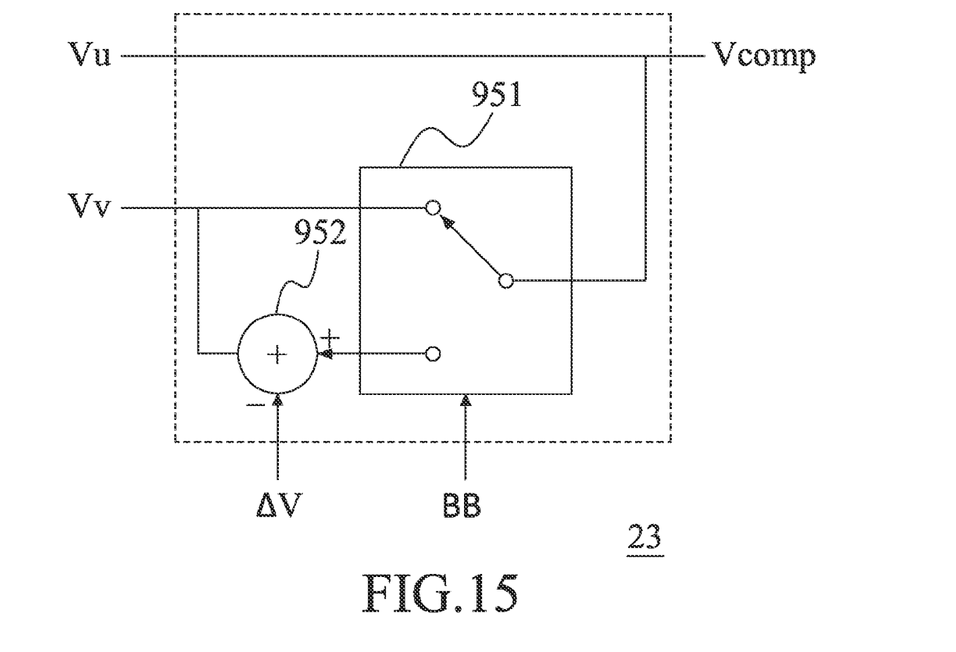
FIG. 15 illustrates a circuit diagram implementing the comparing signal generating circuit shown in FIG. 3.

In fact, the figure illustrated previously with regard to the comparing signal generating circuit 23 is only an example, and please refer to FIG. 15 for the basic concept thereof. In FIG. 15, the comparing signal generating circuit 23 includes a switch 951 and an adder 952; when the operation is the buck mode or boost mode, the compensative voltage Vcomp is output as the reference compensative voltage Vu directly and is shifted a direct current level ΔV which is not less than the peak-to-peak value of the reference waveform signals Vx and Vy via the adder 952 so as to generate the reference compensative voltage Vv. Besides, when the operation is in the buck-boost mode, the compensative voltage Vcomp is output as the reference compensative voltages Vu and Vv directly.

Figure 16:
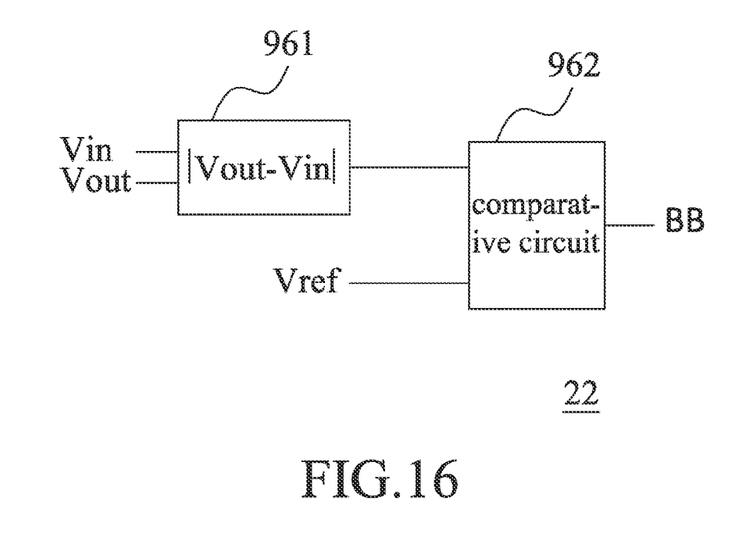
FIG. 16 illustrates a circuit diagram implementing the mode determinative circuit shown in FIG. 4.

Besides, the mode determinative circuit 22, which has been illustrated in the figures and recited previously, is only an example, and please refer to FIG. 16 for the basic concept thereof. It is a schematic diagram for implementing the mode determinative circuit 22 shown in FIG. 4. The mode determinative circuit 22 in FIG. 16 includes a differential generator 961 and a comparative circuit 962 in which the differential generator 961 is utilized to figure out an absolute difference value between the input voltage Vin and the output voltage Vout, and the comparative circuit 962 compares the absolute difference value with the mode reference voltage Vref. When the absolute difference value is less than the mode reference voltage Vref, the buck-boost operation mode signal BB is set as the high level.

Figure 17:
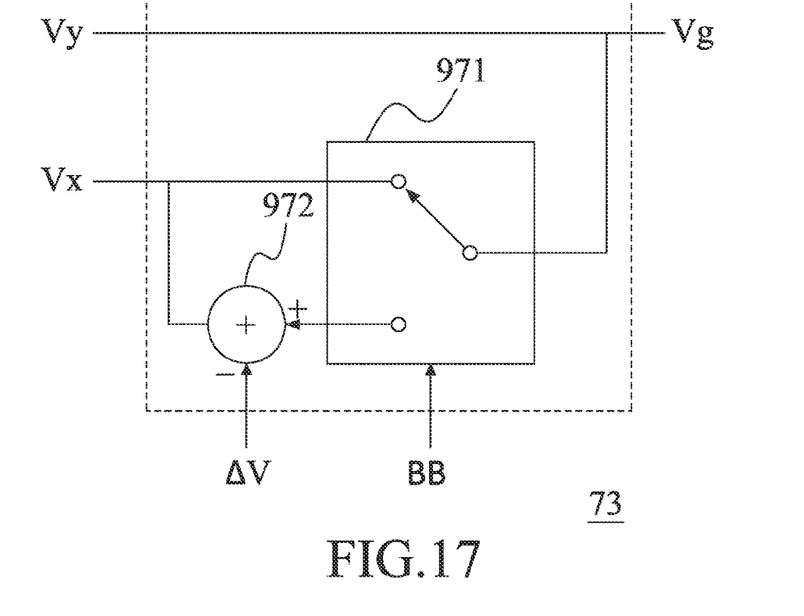
FIG. 17 illustrates a circuit diagram implementing the comparing signal generating circuit shown in FIG. 8.

Besides, the comparing signal generating circuit 73, which has been illustrated in the figures and recited previously, is only an example, and please refer to FIG. 17 for the basic concept thereof. It is a schematic diagram for implementing the comparing signal generating circuit 73 shown in FIG. 8. The comparing signal generating circuit 73 shown in FIG. 17 includes a switch 971 and an adder 972 to output the waveform signal Vg as the reference waveform signal Vy directly and shift the waveform signal Vg a direct current level ΔV which is not less than the peak-to-peak value thereof so as to generate the reference waveform signal Vx when the operation is in the buck mode or the boost mode. In addition, when the operation is under the buck-boost mode, the waveform signal Vg is output as the reference waveform signals Vy and Vx directly.

Figure 18:
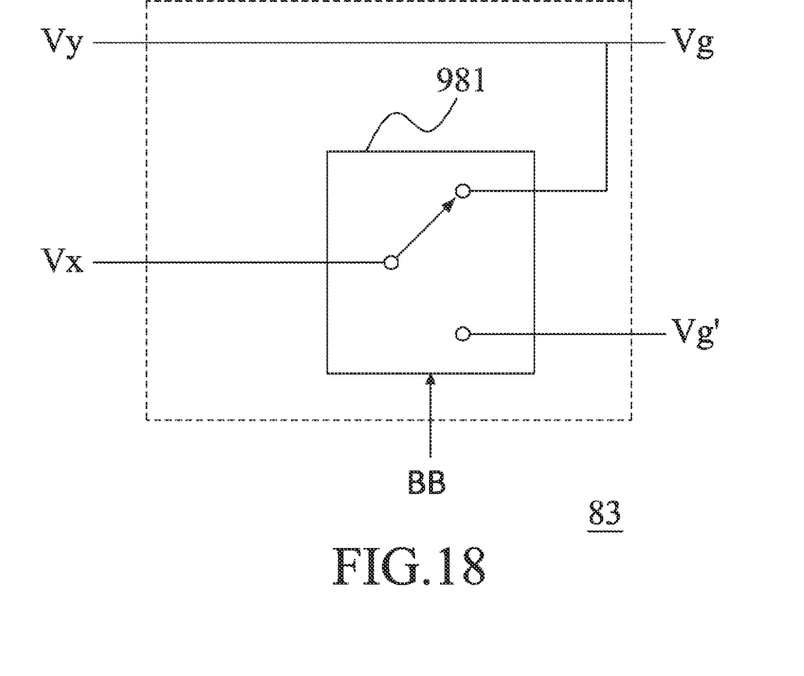
FIG. 18 illustrates a circuit diagram implementing the comparing signal generating circuit shown in FIG. 12.

Besides, the comparing signal generating circuit 83, which has been illustrated in the figures and recited previously, is only an example, and please refer to FIG. 18 for the basic concept thereof. It is a schematic diagram for implementing the comparing signal generating circuit 83 shown in FIG. 12. The comparing signal generating circuit 83 shown in FIG. 18 includes a switch 981 to output the waveform signal Vg as the reference waveform signal Vy directly and output the waveform signal Vg' as the reference waveform signal Vx directly when the operation is in the buck mode or the boost mode. In addition, when the operation is in the buck-boost mode, the waveform signal Vg is output as the reference waveform signals Vy and Vx.

From the foregoing, it can be concluded that a control method of a buck-boost switching converter according to the present invention is adapted to control the buck-boost switching converter to regulate the input voltage of the buck-boost switching converter as a steady output voltage. The buck-boost switching converter has an input end, an output end, a ground end, an inductor, a first switch connected to the input end and the first end of the inductor, a second switch connected to the first end of the inductor and the ground end, a third switch connected to the second end of the inductor and the ground end, and a fourth switch connected to the second end of the inductor and the output end.

The control method comprises following steps: a compensative voltage being generated based on the output voltage of the buck-boost switching converter and output reference voltage; judging and generating a buck-boost operation mode signal based on the input voltage, the output voltage and the mode reference voltage to determine the timing for the operation being in the buck-boost mode; generating at least a periodic waveform signal; generating a first reference compensative voltage and a second reference compensative voltage based on the generated compensative voltage; generating a first reference waveform signal and a second reference waveform signal based on the generated waveform signal; generating the first, second, third, and fourth control signals for controlling the first, second, third, and fourth switches respectively to turn off the second switch during the first switch being on, to turn on the second switch during the first switch being off, to turn off the fourth switch during the third switch being on, to turn on the fourth switch during the third switch being off. In addition, when the operation is in the buck-boost mode, duty cycles of the first and third switches are identical and duty cycles of the second and fourth switches are identical.

Wherein, when the operation is in the buck-boost mode, the first and second reference compensative voltages are set to be identical, and the first and second reference waveform signal are set to be identical such that the duty cycles of the first and third switches are controlled to be identical, and the duty cycles of the second and fourth switches are controlled to be identical.

Wherein, when the operation is in the buck mode or the boost mode, the generated compensative voltage is output as a first reference compensation voltage and shifted a direct current level which is not less than a peak-to-peak value of the first and second reference waveform signal so as to generate a second reference compensative voltage; when the operation is in the buck-boost mode, the compensative voltage is output as the first and second compensative voltages directly.

Wherein, when the operation is in the buck mode or the boost mode, the waveform signal is output as a first reference waveform signal and shifted a direct current level which is not less than a peak-to-peak value of the waveform signal so as to generate a second reference waveform signal; when the operation is in the buck-boost mode, the waveform signal is output as the first and second reference waveform signals directly.

Wherein, steps to generate at least one periodic waveform signal include: generating a periodic wave signal; sensing a current passing through the inductor or one of the first, second and third switch to generate a sensing waveform signal; and summing up the periodic wave signal and the sensing waveform signal to generate a needed waveform signal.

Wherein, steps to determine the buck-boost mode include: generating an input-output difference between the input voltage and the output voltage; generating an output-input difference between the input voltage and the output voltage; generating a buck-boost operation mode signal for controlling the buck-boost switching converter to be operated in the buck-boost mode in case of both the input-output difference and the output-input difference being less than the mode reference voltage.

Wherein, steps to generate the control signal include: comparing the first compensative voltage with the first reference waveform signal to generate a first comparative result; comparing the second compensative voltage with the second reference waveform signal to generate a second comparative result; and generating a first, second, third and fourth control signals based on the first and second comparative results for controlling the first, second, third and fourth switches.

While the invention has been described with referencing to a preferred embodiment thereof, it is to be understood that modifications or variations may be easily made without departing from the spirit of this invention, which is defined by the appended claims.

What is claimed is:

1. A control circuit adapted to control a buck-boost switching converter which has an input end, an output end, a ground end, an inductor with first end and a second end, a first switch connected to the input end and the first end of said inductor, a second switch connected to the first end of said inductor and the ground end, a third switch connected to the second end of said inductor and the ground end, and a fourth switch connected to the second end of said inductor and the output end, wherein an input voltage of the buck-boost switching converter is regulated as a steady output voltage, comprising:

a feedback compensative circuit coupled to the output end and an output reference voltage to generate a compensative voltage based on the output voltage and the output reference voltage;

a mode determinative circuit judging and generating a buck-boost operation mode signal based on the input voltage, the output voltage, and a mode reference voltage to determine a timing of an operation in the buck-boost mode;

a waveform generating circuit generating at least a periodic waveform signal;

a comparing signal generating circuit coupled to said waveform generating circuit, said feedback compensative circuit, and said mode determinative circuit to generate a first reference compensative voltage and a second reference compensative voltage based on the compensative voltage, and to generate a first reference waveform signal and a second reference waveform signal based on said at least one waveform signal; and a control signal generating circuit coupled to said comparing signal generating circuit, to generate a first, second, third, and fourth control signals to control said first, second, third, and fourth switches respectively based on said first and second reference compensative voltages and said first and second reference waveform signals so as to turn off the second switch during the first switch being on, turn on the second switch during the first switch being off, turn off the fourth switch during the third switch being on, and turn on the fourth switch during the third switch being off, and duty cycles of said first and third switches being identical and duty cycles of said second and fourth switches being identical during the operation in the buck-boost mode;

wherein said comparing signal generating circuit is a level shifting circuit which comprises a resistor, and a current source connecting with said resistor in series.

2. The control circuit as defined in claim 1, wherein said comparing signal generating circuit outputs said first and second reference compensative voltages, and said first and second reference waveform signals; when an operation is in the buck-boost mode, said first and second reference compensative voltages are identical to each other, and said first and second reference waveform signals are identical to each other as well.

3. The control circuit as defined in claim 1, wherein the compensative voltage is output by the level shifting circuit as the first reference compensative voltage directly and shift the compensative voltage to a direct current level which is not less than a peak-to-peak value of the first and second reference waveform signals so as to generate said second reference compensative voltage when the operation is in the buck mode or the boost mode.

4. The control circuit as defined in claim 3, wherein said level shifting circuit further comprises:
a switch connecting with said resistor in parallel
wherein said resistor coupled to the feedback compensative circuit, and said switch is controlled by the buck-boost operation mode signal to operate turn-on and turn-off.

5. The control circuit as defined in claim 3, wherein said resistor is coupled to said feedback compensative circuit and said current source is controlled by the buck-boost operation mode signal to determine magnitude of a current passing through said resistor.

6. The control circuit as defined in claim 1, wherein said at least one waveform signal is output by the level shifting circuit as the first reference waveform signal directly and shift the waveform signal to a direct current level which is not less than a peak-to-peak value of the waveform signal so as to generate said second reference waveform signal when the operation is in the buck mode or the boost mode.

7. The control circuit as defined in claim 6, wherein said level shifting circuit further comprises:
a switch connecting with said resistor in parallel;
wherein said resistor is coupled to the waveform generating circuit, and said switch is controlled by the buck-boost operation mode signal to operate turn-on and turn-off.

8. The control circuit as defined in claim 6, wherein said resistor is coupled to said waveform generating circuit, and said current source is controlled by the buck-boost operation mode signal to determine magnitude of a current passing through said resistor.

9. The control circuit as defined in claim 1, wherein said waveform generating circuit comprises:
a first oscillator; and
a first waveform generator coupled to said first oscillator to generate said at least one waveform signal as said first reference waveform signal.

10. The control circuit as defined in claim 1, wherein said waveform generating circuit further comprises:
a second oscillator; and
a second waveform generator coupled to said second oscillator to generate another waveform signal as said second reference waveform signal.

11. The control circuit as defined in claim 1, wherein said waveform generating circuit comprises:
a first oscillator;
a first waveform generator coupled to said first oscillator to generate a first periodic wave signal;
a first current sensor sensing the current passing through said inductor or one of the first, second, and third switches to generate a first sensing waveform signal; and
a first summation circuit coupled to said first current sensor and said first waveform generator to sum up the first periodic wave signal and said first sensing waveform signal so as to generate said at least one waveform signal as said first reference waveform signal.

12. The control circuit as defined in claim 1, wherein said waveform generating circuit further comprises:
a second oscillator;
a second waveform generator coupled to said second oscillator to generate a second periodic wave signal;
a second current sensor sensing a current passing through said inductor or one of the first, second, and third switches to generate a second sensing waveform signal; and
a second summation circuit coupled to said second current sensor and said second waveform generator to sum up the second periodic wave signal and said second sensing waveform signal so as to generate another waveform signal as said second reference waveform signal.

13. The control circuit as defined in claim 1, wherein said mode determinative circuit comprises:
a first differential generator generating an input-output difference between said input voltage and said output voltage;
a second differential generator generating an output-input difference between said input voltage and said output voltage;
a first comparator having a first input end connected to said first differential generator, a second input end connected to said mode reference voltage, and an output end;
a second comparator having a first input end connected to said second differential generator, a second input end connected to said mode reference voltage, and an output end; and
an AND gate having two input ends connecting with the output end of said first comparator and the output end of said second comparator respectively to generate said buck-boost operation mode signal.

14. The control circuit as defined in claim 13, wherein said mode reference voltage is adjustable.

15. The control circuit as defined in claim 1, wherein said feedback compensative circuit comprises:
an amplifier having an output end, a first input end and a second input end connected to the output reference voltage;
a first resistor disposed between and connected to said output end and said first input end; and
a second resistor disposed between and connected to said first input end and said ground end.

16. The control circuit as defined in claim 1, wherein said control signal generating circuit comprises:
a first comparator having a first input end connected to the first reference compensative voltage, a second input end connected to the first reference waveform signal, and an output end;
a second comparator having a first input end connected to the second reference compensative voltage, a second input end connected to the second reference waveform signal, and an output end; and
a driving circuit coupled to the output end of said first comparator and the output end of the second comparator to generate the first, second, third, and fourth control signals based on the comparative results of said first and second comparators to control the first, second, third and fourth switches respectively.

17. A control method adapted to control a buck-boost switching converter which has an input end, an output end, a ground end, an inductor with first end and a second end, a first switch connected to the input end and the first end of said inductor, a second switch connected to the first end of said inductor and the ground end, a third switch connected to the second end of said inductor and the ground end, and a fourth switch connected to the second end of said inductor and the output end, wherein an input voltage of the buck-boost switching converter is regulated as a steady output voltage, comprising following steps:

(a) generating a compensative voltage based on the output voltage and the output reference voltage;
(b) judging and generating a buck-boost operation mode signal based on the input voltage, the output voltage, and a mode reference voltage to determine a timing of an operation in the buck-boost mode;
(c) generating at least one periodic waveform signal;
(d) generating a first reference compensative voltage and a second reference compensative voltage based on the compensative voltage, and generating a first reference waveform signal and a second reference waveform signal based on said at least one waveform signal; and
(e) generating a first, second, third, and fourth control signals to control said first, second, third, and fourth switches respectively based on said first and second reference compensative voltages and said first and second reference waveform signals so as to turn off the second switch during the first switch being on, turn on the second switch during the first switch being off, turn off the fourth switch during the third switch being on, and turn on the fourth switch during the third switch being off, and duty cycles of said first and third switches being identical and duty cycles of said second and fourth switches being identical during the operation being in the buck-boost mode;
wherein step (a) is performed by a feedback compensative circuit; step (c) is performed by a waveform generating circuit; step (d) is performed by a comparing signal generating circuit which is a level shifting circuit and comprises a resistor, and a current source connecting with said resistor in series.

18. The control method as defined in claim 17, wherein said first and second reference compensative voltages which are set to be identical, and said first and second reference waveform signals which are set to be identical when the operation is in the buck-boost mode.

19. The control method as defined in claim 17, wherein the compensative voltage is output by the level shifting circuit as the first reference compensative voltage directly and shifted to a direct current level which is not less than a peak-to-peak value of the first and second reference waveform signals so as to generate said second reference compensative voltage when the operation is in the buck mode or the boost mode.

20. The control method as defined in claim 19, wherein the compensative voltage is output by the level shifting circuit as the first reference compensative voltage and the second reference compensative voltage when an operation is under the buck- boost mode, wherein the resistor of the level shifting circuit is coupled to the feedback compensative circuit, and the level shifting circuit further comprises a switch connecting with said resistor in parallel to operate turn-on and turn-off.

21. The control method as defined in claim 17, wherein the waveform signal is output by the level shifting circuit as the first reference waveform signal directly and shifted to a direct current level which is not less than a peak-to-peak value of the waveform signal so as to generate said second reference waveform signal when an operation is in the buck mode or the boost mode.

22. The control method as defined in claim 21, wherein the waveform signal is output by the level shifting circuit as the first reference waveform signal and the second reference waveform signal when an operation is in the buck-boost mode, wherein the resistor of the level shifting circuit is coupled to the waveform generating circuit, and the level shifting circuit further comprises a switch connecting said resistor in parallel to operate turn-on and turn-off.

23. The control method as defined in claim 17, wherein steps for generating at least a periodic waveform signal comprises:
generating a periodic wave signal;
sensing a current passing through the inductor or one of the first, second, third and fourth switches to generate a sensing waveform signal; and
summing up said periodic wave signal and said sensing waveform signal to generate the waveform signal.

24. The control method as defined in claim 17, wherein steps for determining the buck-boost mode comprises:
generating an input-output difference between said input voltage and said output voltage;
generating an output-input difference between said input voltage and said output voltage;
generating said buck-boost operation mode signal for the buck-boost switching converter operating in the buck-boost mode when the input-output difference and the output-input difference are less than the mode reference voltage.

25. The control method as defined in claim 24, wherein said mode reference voltage is adjustable.

26. The control method as defined in claim 17, wherein steps for generating the control signal comprises:
comparing the first reference compensative voltage with the first reference waveform signal to generate a first comparative result;
comparing the second reference compensative voltage with the second reference waveform signal to generate a second comparative result; and
generating the first, second, third, and fourth control signals based on the first and second comparative results to control the first, second, third and fourth switches respectively.

* * * * *